(12) United States Patent
Randolph, Jr. et al.

(10) Patent No.: US 6,453,211 B1
(45) Date of Patent: Sep. 17, 2002

(54) NOMINAL SHIFT MACHINING

(75) Inventors: James E. Randolph, Jr., Mason, OH (US); David E. Ehling, Morrow, OH (US); Michael J. Brunck, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/517,020

(22) Filed: Mar. 2, 2000

(51) Int. Cl.[7] ............................................. G06F 15/00
(52) U.S. Cl. ........................ 700/193; 700/195; 700/192
(58) Field of Search .................. 700/164, 176, 700/186, 195, 193, 192; 318/568.1; 416/193 R; 29/889.1

(56) References Cited

U.S. PATENT DOCUMENTS

| | | | |
|---|---|---|---|
| 4,382,215 A | | 5/1983 | Barlow et al. ............... 318/568 |
| 4,517,504 A | * | 5/1985 | Honji et al. ............. 318/568.1 |
| 4,636,960 A | * | 1/1987 | McMurtry .................. 318/572 |
| 4,866,643 A | * | 9/1989 | Dutler .......................... 33/504 |
| 4,942,611 A | | 7/1990 | Kunugi et al. ......... 364/474.06 |
| 5,285,572 A | | 2/1994 | Rathi et al. ................. 29/889.1 |
| 5,288,209 A | | 2/1994 | Therrien et al. ............. 416/193 |
| 5,357,450 A | * | 10/1994 | Hemmerle et al. ......... 700/176 |
| 5,479,704 A | * | 1/1996 | Richter et al. ............. 29/889.1 |

FOREIGN PATENT DOCUMENTS

EP 0453391 * 10/1991 ........... G05B/19/42

* cited by examiner

*Primary Examiner*—Leo Picard
*Assistant Examiner*—Alexander Kosowski
(74) *Attorney, Agent, or Firm*—V. G. Ramaswamy; Francis L. Conte (57) ABSTRACT

The nominal configuration of a workpiece is stored in a multiaxis numerically controlled machine. The workpiece is probed in the machine to determine an offset from the nominal configuration. The workpiece is then shifted by the offset to correspond with the nominal configuration. The workpiece is then machined according to the nominal configuration.

22 Claims, 5 Drawing Sheets

NOMINAL SHIFT MACHINING

The invention herein described was made in the course of or under a contract or subcontract thereunder (or grant) with the Department of the Navy.

BACKGROUND OF THE INVENTION

The present invention relates generally to manufacturing, and, more specifically, to machining individual workpieces.

A gas turbine engine compressor includes a row of compressor rotor blades or airfoils extending radially outwardly from a supporting disk. Each blade may include an integral dovetail for removably mounting the blade to the perimeter of a disk having a complementary dovetail slot therein. Or, the blades may be integrally formed with the disk in a one-piece or unitary bladed-disk assembly commonly referred to as a blisk.

Each blade has an airfoil configuration with a generally concave pressure side and an opposite generally convex suction side extending radially in span from root to tip between axially spaced apart leading and trailing edges. The airfoil has a complex three-dimensional (3D) configuration and typically is twisted about its radial stacking axis.

Disk blades or blisk blades may be manufactured in various manners, and with different degree of difficulty and expense. In either case, material must be removed from an initial workpiece to achieve the desired configuration of the airfoil in accordance with its design specification.

The configuration of each airfoil is typically defined by a suitable number of surface points in a three-dimensional coordinate system. The nominal configuration of each blade specifies its desired aerodynamic shape and relative position of its features.

Since all manufacturing processes are subject to random variations in material removal, the nominal configuration is bounded by suitably small tolerances of larger and smaller variations in dimensions which are acceptable for a particular design. For example, the dimensions of a particular component design may vary up to a few mils either greater than or less than the nominal dimension for the desired configuration.

Accordingly, during the manufacture of individual blades the final configuration thereof is never exactly the same as the nominal configuration but varies within the permitted tolerances over the entire outer surface of the component. Since a given rotor stage has a considerable number of blades around the perimeter of the supporting disk, no two blades will be identically alike although all the blades will be formed within the permitted tolerances of the nominal configuration.

Random variations in the final configuration of the blades will occur irrespective of the particular method of forming the blades. For example, electrochemical machining (ECM) erodes material from a workpiece using a pair of cathode electrodes having contours complementary with the desired side contours of the blade.

Individual blades may also be formed using a numerically controlled milling machine in which the nominal configuration of the blade is stored in a suitable coordinate system and the cutting tool follows a corresponding cutting path around the workpiece for forming the final configuration thereof.

In both examples described above, the individual blades are formed using the nominal configuration thereof subject to the permitted tolerances or variations in final surface dimensions.

Gas turbine engine blades are typically manufactured from high strength materials with a high degree of accuracy reflected by relatively small manufacturing tolerances, and thusly the cost of production is relatively high. A blade may be damaged during the manufacturing process or during use in the gas turbine engine and it is therefore desired to repair that blade for preventing the wasteful scrapping thereof.

For a rotor disk having removable blades this is less of a problem since an individual blade may be more readily repaired remote from the disk or simply substituted with another blade. However, for a blisk having integral blades, a damaged blade must be repaired in situ since otherwise the entire blisk including its many blades is subject to scrapping.

In a recent development program, the weld repair of titanium blisks for a gas turbine compressor application is being explored. Damage to the relatively thin leading or trailing edges of an individual blade may be repaired by removing the damaged portion and weld repairing the remaining cutout. Either weld material may be built up in the cutout, or a suitable spad insert may be welded therein.

In either case, the weld repair is intentionally made larger than the nominal configuration of the blade so that the repair may be subsequently blended with the original blade contour. Since the blade is an aerodynamic component, a smooth surface thereof is required without steps or discontinuities which would adversely affect aerodynamic performance. The weld repair may be manually blended to shape using a grinder, for example, but is subject to corresponding inaccuracies.

Machine blending of the weld repair is desired but the inherent variation of the configuration of an individual blade from the nominal configuration introduces an additional uncertainty in the machining process which will cause either insufficient or excessive machining at the weld repair relative to the undamaged adjacent surfaces, and resulting discontinuities or steps therebetween.

Accordingly, it is desired to provide a process for re-machining a pre-machined workpiece to a nominal configuration within the originally specified tolerances therefor.

BRIEF SUMMARY OF THE INVENTION

The nominal configuration of a workpiece is stored in a multiaxis numerically controlled machine. The workpiece is probed in the machine to determine an offset from the nominal configuration. The workpiece is then shifted by the offset to correspond with the nominal configuration. The workpiece is then machined according to the nominal configuration.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
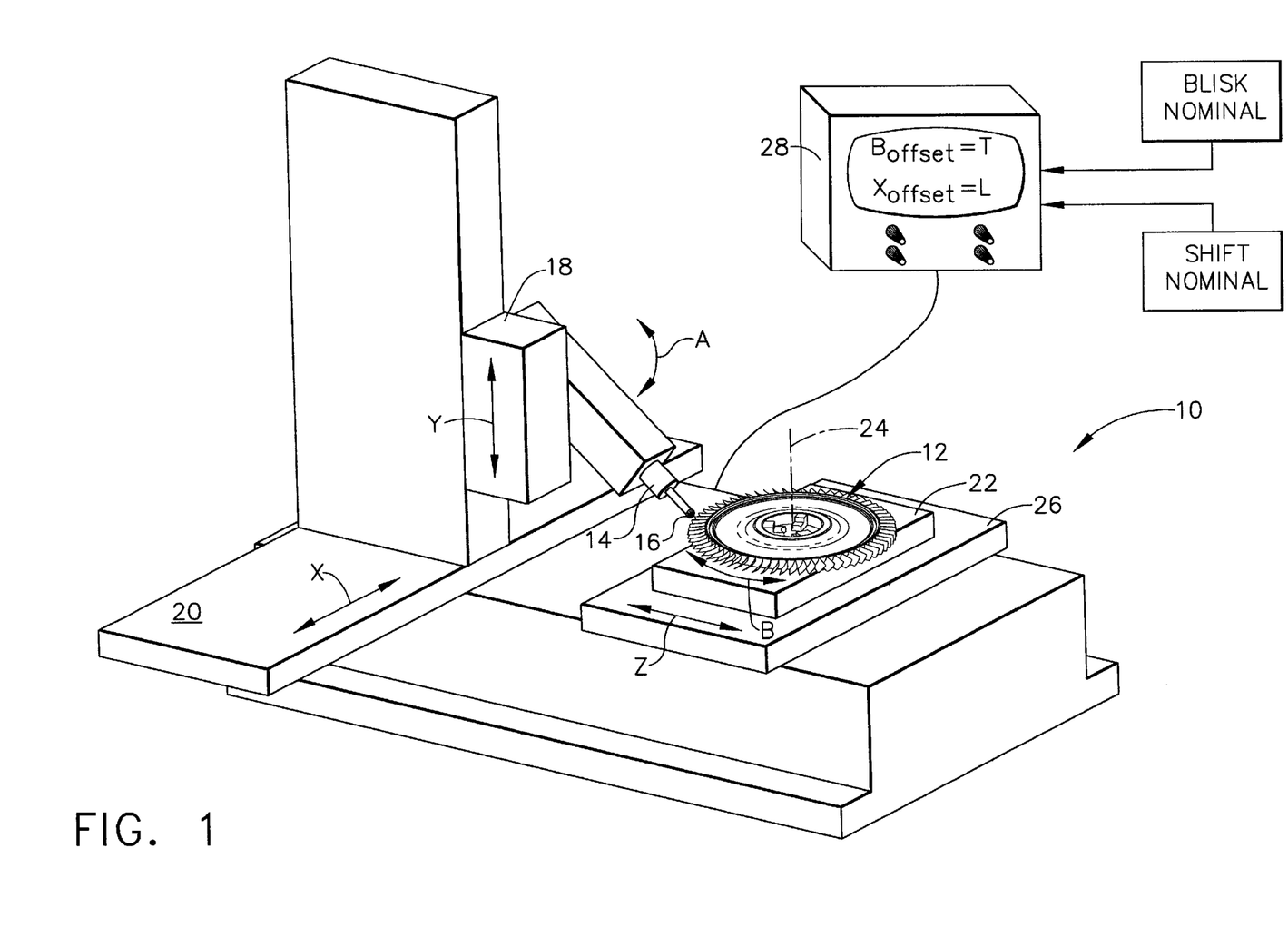
FIG. 1 is a schematic representation of a milling machine configured for machining a workpiece in accordance with one embodiment of the present invention.

Illustrated schematically in FIG. 1 is a multiaxis numerically controlled machine 10 configured in accordance with the present invention for machining a workpiece 12 in the exemplary form of a gas turbine engine compressor blisk. The machine itself may have any conventional configuration, such as a five axis milling machine in the exemplary form of a T30 Machining Center commercially available from the Cincinnati Machine Company of Ohio.

The machine includes a rotary power head or spindle 14 which receives a suitable machining tool or cutter 16 therein. The spindle 14 is pivotally mounted to an elevator 18 for providing one rotary axis A of movement. The elevator 18 is mounted to a corresponding frame and introduces a second axis of vertical translation movement Y.

The frame is mounted to a carriage 20 which introduces a horizontal translation axis of movement X orthogonal to the vertical translation axis Y. In this way, the location of the cutter 16 may be controlled by the three axes of movement X,Y,A.

The workpiece 12 is mounted or fixtured atop a turntable 22 which introduces rotary movement B of the workpiece 12 about a vertical rotary axis 24 about which the workpiece is coaxially aligned. The turntable 22 sits atop another translation carriage 26 which introduces a third translation axis of movement Z which is orthogonal to the horizontal and vertical movement axes X,Y.

The machine is operatively controlled by a numerical controller 28 in which machining operations are programmed and stored for controlling the path of the cutter 16 in 3D space using the combination of the five machining axes X,Y,Z,A,B in a conventional manner.

Figure 2:
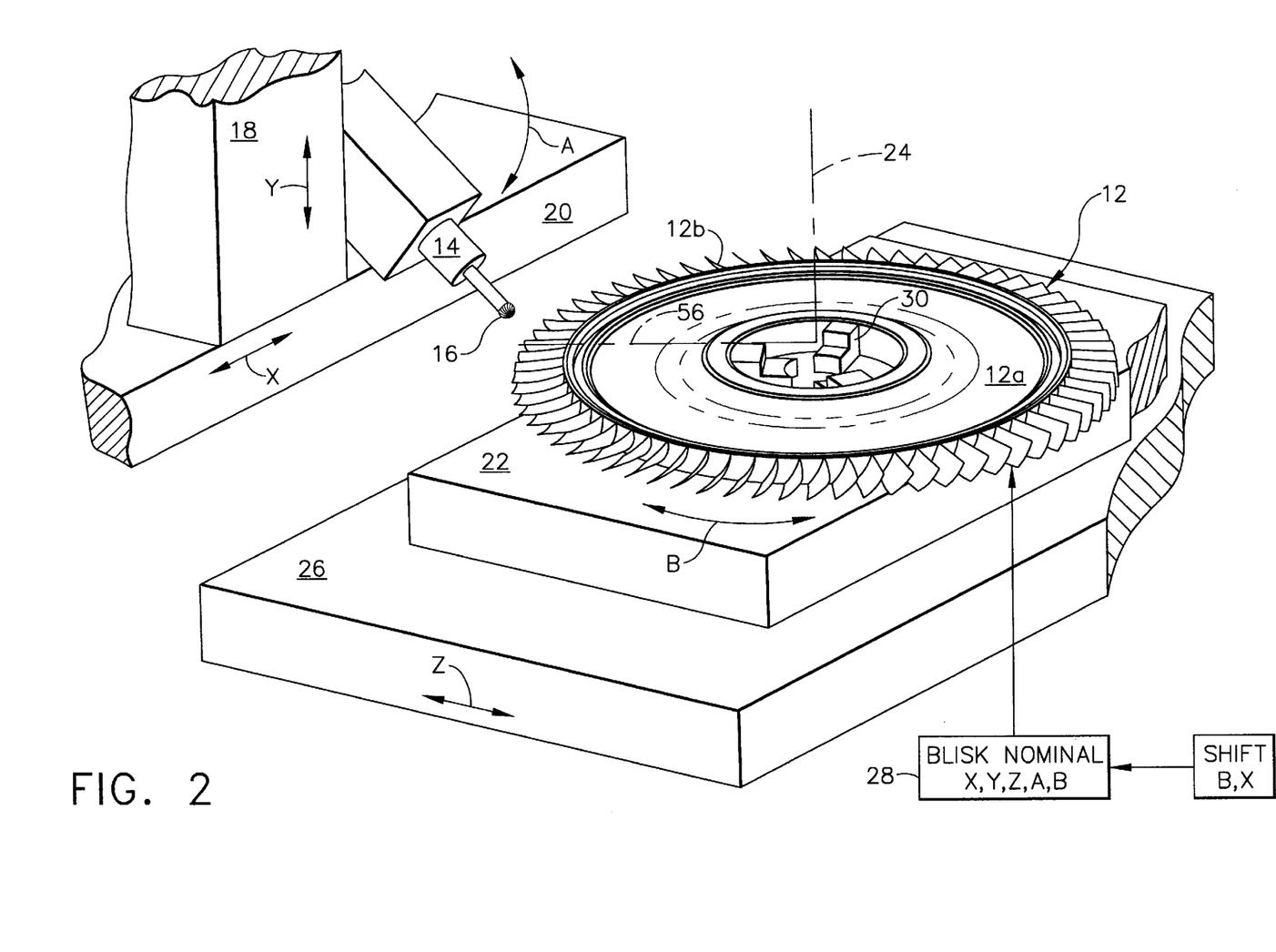
FIG. 2 is an enlarged perspective view of a portion of the machine illustrated in FIG. 1 including an exemplary blisk workpiece mounted therein.

The blisk workpiece 12 is illustrated in more particularity in FIG. 2 mounted in the machine. A suitable fixture 30 is used to mount the blisk 12 with its centerline coincident with the rotary axis 24 of the turntable 22. The blisk includes a supporting disk 12a having a plurality of circumferentially spaced apart blades or airfoils 12b extending radially outwardly from the perimeter thereof in a unitary or one-piece assembly.

The blisk itself may initially be manufactured in any conventional manner such as by electrochemical machining or milling to the nominal configuration thereof within suitable tolerances as described above. For example, the milling machine may be initially operated in a conventional manner in which the nominal configuration of the blisk is stored in memory with a corresponding machining path for the cutter to remove material from an original workpiece blank to form the individual blades 12b in turn.

As indicated above, the nominal configuration of the desired final shape and position of the individual blades 12b supported by the disk 12a may be defined by a suitably large number of individual points over the outer contour of the individual blades as represented by the corresponding coordinates of the machine. For the five-axis machine illustrated in FIG. 2, each point of the nominal configuration of each workpiece blade 12b is defined by the five coordinates X,Y,Z,A,B.

The nominal configuration is suitably stored in the memory of the machine controller 28 along with the desired cutting path required for the cutter 16 to trace or follow the nominal configuration stored in memory. As indicated above, the multiaxis milling machine is conventional, and may be conventionally operated for use in initially machining all the blades 12b of the blisk to their final shape and position within the permitted tolerances of machining.

Typical machining variations prevent the many blades from being identical in configuration with each other, although they are substantially identical within the permitted tolerances. The permitted tolerance variations on the final dimensions of the individual blades will result in various portions thereof being either undersize or oversize, which is typically different from blade to blade.

Figure 3:
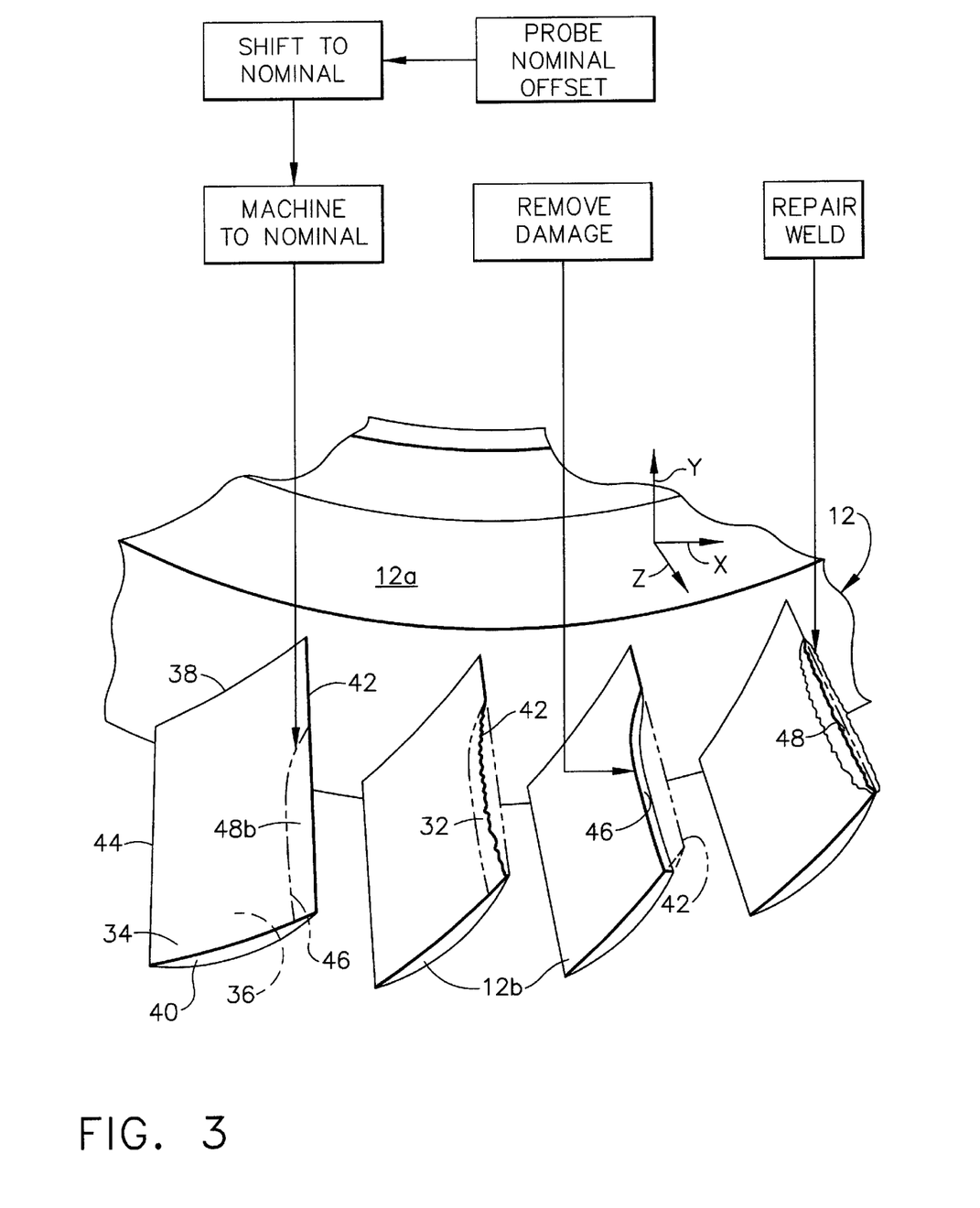
FIG. 3 is an enlarged portion of the blisk illustrated in FIG. 2 and a corresponding flowchart representation of a method for repair thereof in accordance with an exemplary embodiment of the present invention.

FIG. 3 illustrates a portion of the workpiece blisk 12 having four representative blades 12b which were initially machined to final configuration but subjected to damage being repaired in accordance with the present invention. More specifically, the second blade illustrated in FIG. 3 is shown with exemplary damage 32 in the form of bending at the leading edge thereof due to foreign object damage occurring during engine use. It is desired to repair the damage and return the damaged blade to a near-original configuration within the permitted tolerances from the nominal configuration.

As initially shown in FIG. 3, each blade includes a generally concave pressure side or surface 34, and an opposite generally convex suction side or surface 36. The two sides extend from a root 38 integral with the disk 12a to a radially outer tip 40. And the two sides extend axially between radially extending leading and trailing edges 42,44.

As indicated above, the original blisk 12 illustrated in FIG. 3 may be initially manufactured by storing its nominal configuration in the milling machine and then machining or pre-machining the blisk workpiece according to that nominal configuration for forming the final product. As shown in FIG. 3, the final blisk may be subject to blade damage of various sorts, including the bend damage 32 at the leading edge 42 for example.

The blisk may be repaired by initially removing the damage by cutting away the bend damage 32 and leaving a cutout 46 along the leading edge terminating at undamaged original blade material as shown for the third blade. The cutout may then be filled in either with weld material alone or a metallic spad insert welded in place to form a weld repair 48 which is suitably larger than the nominal configuration of the blade thereat as shown for the fourth blade.

For clarity of presentation, FIG. 3 illustrates one blade with the bend damage 32, another blade with the cutout 46, and another blade having the weld repair 48. FIG. 3 also illustrates yet another, first, blade in which the weld repair has been machined to the nominal configuration thereat in accordance with the present invention for creating a weld repair blend 48b matching the surface contour of the adjacent blade material within the permitted tolerances from nominal for eliminating or substantially minimizing any step discontinuities therebetween.

Figure 4:
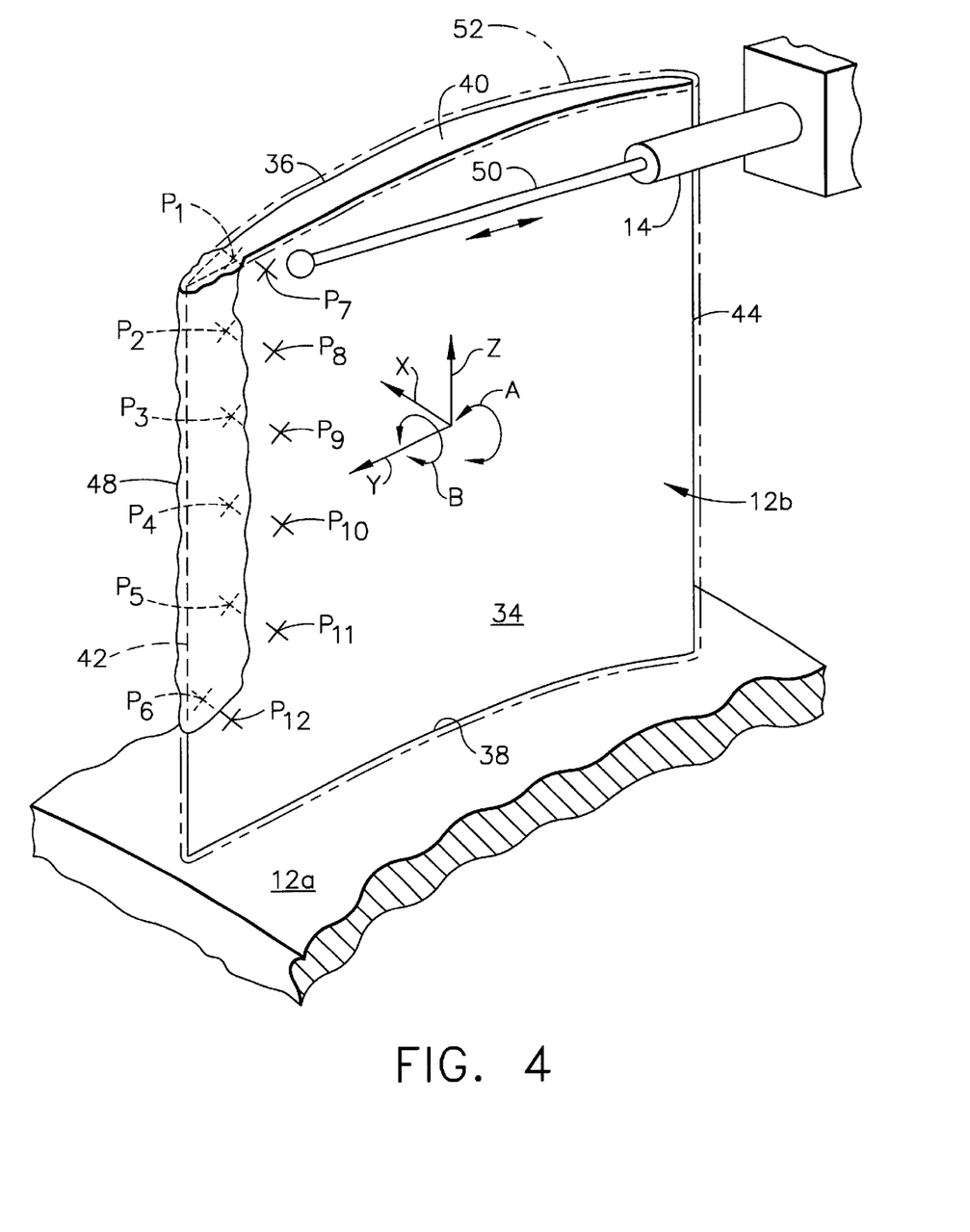
FIG. 4 is an enlarged perspective view of an exemplary one of the blisk blades illustrated in FIG. 3 illustrating probing thereof.

In order to machine blend the weld repair 48 to the original nominal configuration of the blade within the original tolerances, the individual blade is probed in accordance with the present invention to initially determine the offset in the actual configuration of the blade surface from the nominal configuration due to the original machining operation. FIG. 4 illustrates schematically how such probing may be effected in accordance with an exemplary embodiment of the present invention.

A conventional probe 50 is mounted in the spindle 14 of the multiaxis machine for using the coordinate measuring capabilities thereof to probe the surface of the workpiece blade 12b. Although the nominal configuration of the workpiece is stored in the machine, the actual configuration of the premachined 12b randomly varies therefrom within the permitted original tolerances. Any attempt to simply machine the weld repair 48 based on the nominal configuration alone, with the blisk being conventionally referenced in the machine, would result in either insufficient or excessive material removal at the repair and a corresponding step with the undamaged adjacent material since the actual position of the adjacent material is unknown due to the random variation originally provided.

Accordingly by initially probing the workpiece fixtured within the machine itself the offset of the workpiece from the nominal configuration stored in the machine memory may be determined. As shown in FIG. 1, the workpiece may then be shifted in position in the machine by the so determined offset to correspond with the nominal configuration stored in the machine.

In this way, the actual, probed, configuration of the undamaged blade is determined and best fit with the stored nominal configuration so that machining of the weld repair corresponds with the stored nominal configuration will better match the actual configuration of the individual blade to effect machine blending with little or no step with adjacent undamaged material within the original manufacturing tolerances. The shifted workpiece may then be conventionally machined according to the stored nominal configuration for removing the excess material at the weld repair and provide a relatively smooth machine blend with the adjoining original material.

As shown schematically in FIG. 4, the nominal configuration of the blade 12b may be defined by coordinates corresponding with the available multiple axes of the specific machine, such as coordinates representing the X,Y,Z, A,B movement axes. Although all five coordinate axes may be used in determining the offset of the actual blade configuration from the stored nominal configuration, examination of the particular workpiece geometry and testing permits probing of the workpiece in fewer than all of the available multiple axes to sufficiently determine the offset for minimizing the step discontinuity at the junction of the weld repair and original material following machine blending.

For example, since the individual blades 12b illustrated in FIG. 2 are cantilevered from the supporting disk 12a and extend radially outwardly from the rotary axis 24 of the turntable 22, probing of the workpiece blade in the machine may be effected to determine a tilt offset of the blade from the nominal configuration corresponding with the rotational axis 24 of the machine turntable 22. As illustrated in FIG. 3, the individual blades 12b may have a twisted or inclined configuration about corresponding radial stacking axes of the disk 12a which correspond with the translation axis Z when aligned therewith. Accordingly, the blades 12b may additionally or alternatively be probed in the machine to determine a lateral or translation offset of the blade from the nominal configuration corresponding with a linear translation axis, such as either machine axis X or Y, along which the cutter is translated during machining.

The cantilevered blades 12b illustrated in FIG. 3 are subject to elastic deflection during original machining which causes variation in the actual machined configuration thereof along the three coordinate axes X,Y,Z. By shifting the initial reference position of the blisk 12 to compensate for the probed offset between the actual configuration of each blade and the nominal configuration thereof, the machining path of the cutter programmed in the machine to correspond with the nominal configuration better fits the actual configuration of each blade probed prior to machining for machining the weld repair within the original tolerances from nominal.

FIG. 4 illustrates schematically an exemplary manner for probing the workpiece blade 12b. The illustrated blade 12b has a premachined actual configuration shown in solid line, and the exemplary weld repair 48 along the outer span portion of the leading edge 42. Shown in phantom line surrounding the blade is an envelope 52 representing the nominal configuration of the airfoil and the maximum positive tolerance permitted therefor. The positive tolerance is typically up to a few mils larger than the nominal configuration dimensions. The minimum or negative tolerance permits undersize dimensions which are represented by surface contours within the solid line contour of the illustrated blade.

In order to suitably reference the actual blade 12b in the machine relative to the stored nominal configuration for the blade, the blade is probed at one or more spaced apart probed points P1–12. Since only the weld repair 48 requires machining, the probe points are preferably located closely adjacent to the border of the repair 48 on the original parent material of the blade 12b which has not undergone repairing.

Figure 5:
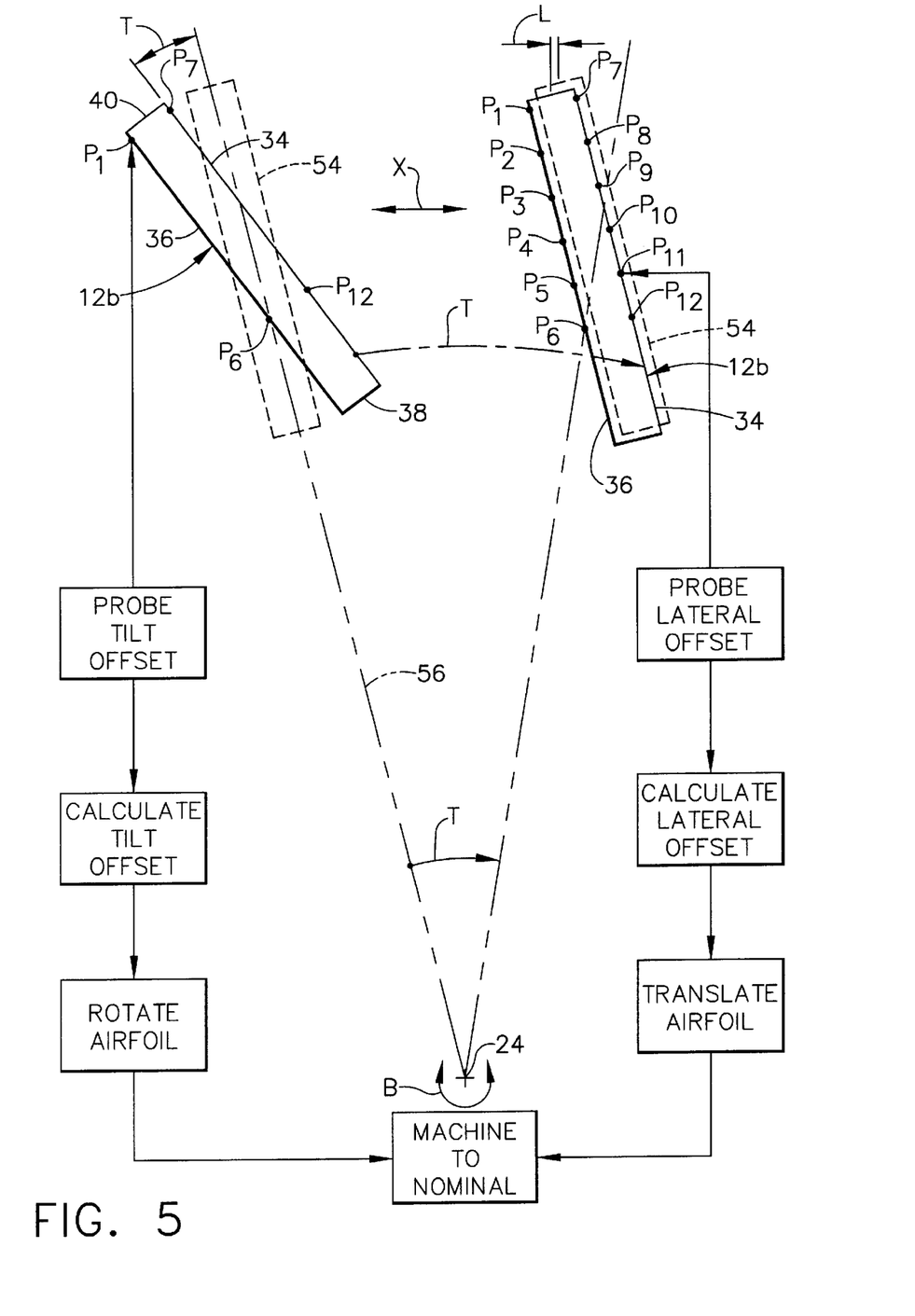
FIG. 5 is a schematic representation of the probed blade illustrated in FIG. 4 and a corresponding flowchart representation of probing thereof in accordance with an exemplary embodiment of the present invention.

FIG. 5 illustrates schematically exemplary methods of probing the blade 12b shown in relevant section along the exemplary twelve probe points in greatly exaggerated configuration for clarity of presentation. Shown in dashed line at the left of FIG. 5 is a portion of the nominal configuration 54 which is stored in the machine memory and from which the original blade 12b was machined. The nominal configuration 54 typically has a centerline aligned with a radial axis 56 of the blade which extends radially outwardly from the axial centerline axis of the rotor disk mounted coaxially with the rotary axis 24 of the supporting turntable. The nominal configuration 54 illustrated in FIG. 5 represents how the machine views the actual blade 12b fixtured therein. However, as indicated above, due to the original machining variations of the blade, the blade varies from the nominal configuration in a random manner.

FIG. 5 also illustrates on the left an exaggerated tilt offset of the blade relative to the nominal configuration and represented by a tilt angle T which may be measured relative to the radial axis 56. In order to determine the tilt offset T between the actual blade and the nominal configuration, the blade is preferably probed at two or more points.

Since the blade is subject to machining variation on both of its opposite sides 34,36, the blade is preferably probed at a pair of radially spaced apart points P1,6 and P7,12 on each of the two sides to determine the workpiece tilt thereat.

Since the blade 12b is fixtured in the machine for rotation about the rotational axis 24, the probe points for determining tilt offset are preferably spaced apart radially along the radial axis 56, and radially outwardly from the rotational axis 24. Probe points P1,7 are located near the blade tip 40 on the undamaged original surface closely adjacent to the boundary of the weld repair 48 as additionally illustrated in FIG. 4. Probe point P6,12 are located radially inwardly therefrom near the innermost boundary of the weld repair 48.

The outer two probe points P1,7 are preferably located opposite to each other along the span of the blade, and the inner probe point P6,12 are also preferably located opposite to each other near the bottom of the blade. The probe 50 is then moved to each of the four probe points P1,6,7,12 to determine the actual coordinates thereof using the coordinate measuring capability inherent in the machine.

The various probe points preferably correspond with similar points defining the nominal configuration of the blade. Accordingly, the midpoints between the outer probe points P1,7 and inner probe points P6,12 may be calculated to define a line therebetween. The orientation of this centerline may then be compared with the corresponding orientation of the similar centerline calculated from the corresponding four points of the nominal configuration. In this way, the relative tilt offset T therebetween may be determined and is illustrated in FIG. 5.

This relative tilt offset T between the actual blade fixtured in the machine and the nominal configuration stored therein may be corrected using the B offset feature found in the machine. Upon probing the blade for determining the tilt offset T, the turntable supporting the blisk may be rotated for shifting the probed blade by the same amount of offset T to correspond with the nominal tilt configuration stored in the machine memory and radially align the actual blade with the nominal configuration. This is shown in FIG. 5 wherein the actual blade 12b at the left may be shifted to the right by the rotational B-offset having the magnitude of the probed tilt offset T. This rotary shifting or indexing of the blade effectively positions the blade parallel to the nominal configuration stored in the machine and reduces or eliminates the probed tilt offset.

Since the blade 12b is also subject to lateral variation in configuration relative to the nominal configuration 54, the blade is preferably also probed at one of the probe points on at least one of the two sides 34,36 to determine the lateral offset L thereat. If the weld repair is made solely on one of the two sides, then lateral probing may be conducted on that side only.

However, since the exemplary weld repair illustrated in FIG. 4 is exposed on both sides of the blade, the blade is preferably probed at a pair of opposite probe points on opposite sides of the blade to determine an average lateral offset of the blade thereat. Since each side of the blade is subject to machining variation within the specified configuration tolerances, lateral probing is preferred on both sides. By averaging the lateral offset on both sides of the blade with corresponding points of the nominal configuration, the blade may be centered for best-fit in the machine to correspond with the stored nominal configuration.

The lateral offset L illustrated in FIG. 5 may be implemented in the machine using the conventional transverse axis X-offset feature provided therein having a magnitude equal to the probed lateral offset L. The lateral shifting or indexing of the blade reduces or eliminates the probed lateral offset. Machining of the weld repair may then be more accurately performed in accordance with the original, stored nominal configuration within the specified tolerances thereof.

In the preferred embodiment, the blade is probed at a plurality of probe points on each of the two opposite sides, with the points thereon being correspondingly opposite to each other to determine an average lateral offset of the workpiece thereat. FIGS. 4 and 5 illustrate twelve exemplary probe points P1–12 arranged in opposite groups of six along the border of the weld repair 48.

Since each of the probe points has a corresponding point in the nominal configuration of the blade, the coordinate measuring capability of the machine may be used to determine the lateral offset along the exemplary translation axis X as illustrated in FIG. 5 between each probe point and its nominal counterpart. By averaging the lateral offsets of the twelve probe points an average lateral offset L may be determined therefor. The transverse X-offset in the machine illustrated in FIG. 1 may then be used to effect the probed lateral offset L along the X axis for shifting the workpiece blade by the lateral offset L to correspond with the nominal configuration along this axis.

Accordingly, the blade 12b illustrated in FIG. 5 may be shifted in B-offset rotation corresponding with the probed tilt offset T and in the X-offset translation corresponding with the lateral offset L which then aligns in a best fit the actual probed configuration of the blade with the nominal configuration stored in the machine. The machine may then be operated for machining the weld repair to the nominal configuration therefor to obtain the machined blend 48b shown in FIG. 3. The transition of the machined blend 48b to the original adjacent material of the blade will be effected within the original tolerances for the nominal configuration, and minimizes or eliminates any discontinuous step thereat. Subsequent manual blending of the weld repair may be minimized or eliminated in this manner.

For the exemplary radially extending weld repair 48 illustrated in FIG. 4, testing has shown that twelve probe points evenly distributed in groups of six on opposite sides of the blade provide an optimum best fit of the actual blade to the nominal configuration for minimizing resulting step discontinuity at the junction of the weld repair and parent material. Probe points greatly exceeding twelve were also evaluated and failed to produce any better fit and are thusly undesirable in view of the added inspection time required therefor. Fewer than twelve probe points were also tested and resulted in less accurate fitting of the blade to the nominal configuration.

The number of probe points used for determining the tilt offset T is preferably fewer than the lateral probe points, and is preferably four probe points as indicated above for determining tilt offset using both sides of the blade. As few as two tilt probe points, however, could be used for a one-side repair if desired.

In the preferred embodiment illustrated in FIGS. 1 and 2, the tilt offset T is firstly determined in the machine, and then the blade is shifted by the so determined tilt offset using the rotational B-offset feature. The rotary shifted blade is then laterally probed for determining the lateral offset L and is then further shifted by the so determined lateral offset L using the translational X-offset. Machining of the so offset blade 12b may then be conventionally preformed in the region limited to the weld repair for returning that region to the nominal configuration within the specified tolerances therefor.

Tilt and lateral probing of the workpiece followed by corresponding shifting therefor, is typically sufficient in a single sequence for best fitting the blade to the nominal configuration and achieving accurate machine blending of the weld repair within the specified tolerances. However, prior to actual machining, the tilt and lateral probing may be conducted again in a second sequence of operation to either refine the required rotary and lateral offsets or confirm the initially determined values. Testing has shown that a single sequence is sufficient. However, in other workpiece configurations iterative probing may be desired for improving the accuracy of the subsequent machining to the original nominal configuration.

In the exemplary embodiment illustrated in FIG. 2, the workpiece undergoing machining is one of the several generally identical blades extending radially outwardly from the supporting disk 12a of the blisk. In practice each of the blades is not identical in configuration but is subject to the random variation and configuration due to the original manufacturing process therefor.

Since the disk is fixtured in the machine for rotation about the rotational axis 24 the same probing process may be repeated for each blade requiring repair. Since each blade is randomly different in configuration from the nominal, each blade requiring repair is preferably probed at the desired probe points spaced radially apart from each other from the rotational axis 24. Probing of one blade will most likely result in different tilt and lateral offsets from those required for any of the other blades requiring repair.

However, the probing operation itself may be programmed into the controller 28 for automating the operation and automatically determining the required B and X offsets used in machining any given blade. The nominal configuration of the workpiece remains unchanged in the machine, and instead the corresponding offsets are effected in initially referencing an individual blade in the machine.

Since the cutting tool 16 illustrated in FIG. 1 is mounted in the spindle 14 for translation in two axes X,Y and is also mounted for pivoting in one rotational axis A, the lateral offset L illustrated in FIG. 5 may be determined along any one of the two translation axes X,Y.

As shown in FIG. 3, each blade includes twists along its radial span axis and is thusly oblique to both the two translations axes X,Y, and therefore manufacturing variations in the configuration of the blade are typically found along both axes X,Y. The lateral offset L may therefore be determined along either axis X,Y, but in the preferred embodiment is determined along the horizontal translation axis X which extends generally tangentially to the perimeter of the disk from which the blades extend radially outwardly.

Since both sides of each blade are subject to original machining variation along the X and Y axes, each blade is preferably probed on both sides thereof for separately determining the required tilt offset T from the nominal configuration corresponding with the rotational axis 24 along the centerline of the disk, and the lateral offset L from the nominal configuration corresponding with the linear translation axis X which is normal to the radial axis 56.

The repair method described above has particular utility for repairing expensive unitary blisks which may have damage to the leading or trailing edges of any one or more of the blades thereof. The locally damaged region of the blade is cut away and weld repair is used for rebuilding the cut-away region larger than the nominal configuration thereat. The weld repair must then be re-machined back to the nominal configuration therefor within specified tolerances with little or no step discontinuity remaining at the interface between the weld repair and the original blade material.

By probing the repaired blade closely adjacent to the weld repair, the offset between the actual configuration and the nominal configuration stored in the machine may be precisely determined. The probed offsets may then be used for best fitting the blade to the nominal configuration using the available offset coordinates of the machine which effectively shifts the nominal configuration and corresponding numerically controlled cutter path to the specific blade presented for repair machining. The resulting machining of the weld repair may be effected within the specified tolerances from the nominal configuration.

Test parts have been re-machined to less than about two mils within the nominal configuration for the blade at all locations along the extent of the weld repair. The two mil machine blending is well within the capability of manual hand polishing to complete the blending of the weld repair if desired.

Although the method described above has particular utility for machining repaired blisk airfoils, it may be used for any type of premachined part requiring subsequent machining to the nominal configuration therefor. Any workpiece removed from its fixturing in a numerically controlled machine necessarily loses its original reference with the nominal configuration stored in the machine. The original reference feature for a workpiece is useful during the initial machining of the workpiece but is rendered obsolete once machining is complete and the random variations of the configuration from nominal are made. And, any initial offsets used for initial referencing of a workpiece are also rendered obsolete upon completion of the initial machining of the component.

The exemplary embodiments of the probing described above permit the available offset capabilities of a machine to be used for repositioning a workpiece in a best fit approximation to the original nominal configuration therefor. In this way, remachining of the same workpiece may be effected using the original nominal configuration of the workpiece, and adjusting the actual configuration in 3D space of the re-fixtured workpiece to best correspond thereto. Re-machining of the original workpiece, at a weld repair location for example, may then be conducted in an otherwise conventional manner with the advantage of precise correspondence between the actual and nominal configurations of the component so that it may be re-machined within the original manufacturing tolerances.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A method of machining a workpiece in a multiaxis numerically controlled machine comprising:
    storing in said machine a nominal configuration of said workpiece deined by a plurality of contour points represented by coordinates of said multiple axes;
    probing said workpiece in said machine to determine a common offset of said workpiece from said nominal configuration;
    shifting said workpiece by said common offset to correspond with said nominal configuration; and
    machining said shifted workpiece according to said nominal configuration while maintaining said common offset.

2. A method according to claim 1 further comprising probing said workpiece in said machine to determine a common tilt offset of said workpiece from said nominal configuration corresponding with a rotational axis of said machine.

3. A method according to claim 2 wherein said workpiece includes opposite sides and is probed at a pair of spaced apart points on each of said sides to determine said tilt offset.

4. A method according to claim 3 wherein said probe points on said workpiece opposite sides are opposite to each other, and said tilt offset is determined at midpoints between said opposite probe points.

5. A method according to claim 3 further comprising fixturing said workpiece in said machine for rotation about said rotational axis, and said probe points are spaced radially apart from said rotational axis.

6. A method according to claim 1 further comprising probing said workpiece in said machine to determine a common lateral offset of said workpiece from said nominal configuration corresponding with a linear axis of said machine.

7. A method according to claim 6 wherein said workpiece includes opposite sides and is probed at a point on at least one of said sides to determine said lateral offset.

8. A method according to claim 7 wherein said workpiece is probed at a pair of opposite points on said opposite sides to determine an average lateral offset of said workpiece thereat.

9. A method according to claim 8 wherein said workpiece is probed at a plurality of points on each of said opposite sides being correspondingly opposite to each other to determine an average lateral offset of said workpiece thereat.

10. A method according to claim 9 further comprising fixturing said workpiece in said machine for rotation about a rotational axis of said machine, and said probe points are spaced radially apart from said rotational axis.

11. A method according to claim 1 further comprising:
probing said workpiece in said machine to determine a common tilt offset of said workpiece from said nominal configuration corresponding with a rotational axis of said machine and
probing said workpiece in said machine to determine a common lateral offset of said workpiece from said nominal configuration corresponding with a linear axis of said machine.

12. A method according to claim 11 wherein said workpiece includes opposite sides and is probed at a plurality of points on each of said opposite sides to determine said lateral offset, and is further probed at fewer than said lateral probe points to determine said tilt offset.

13. A method according to claim 12 further comprising fixturing said workpiece in said machine for rotation about said rotational axis, and said probe points are spaced radially apart from said rotational axis on each side to determine both said tilt and lateral offsets.

14. A method according to claim 12 wherein said tilt offset is firstly determined, then said workpiece is shifted by said tilt offset, and followed in turn by determining said lateral offset and then further shifting said workpiece thereby.

15. A method according to claim 11 wherein said workpiece is probed along said multiple axes to determine said offset in fewer than all said multiple axes.

16. A method according to claim 11 further comprising:
pre-machining said workpiece according to said nominal configuration;
repairing said workpiece with a repair larger than said nominal configuration; and
then probing said workpiece adjacent said repair, shifting said workpiece by said offset, and machining said workpiece at said repair to blend said repair according to said nominal configuration thereat.

17. A method according to claim 16 wherein:
said workpiece comprises one of several blades extending radially outwardly from an integral supporting disk;
said disk is fixtured in said machine for rotation about said rotational axis; and
said workpiece blade is probed at a plurality of points spaced radially apart from said rotational axis.

18. A method according to claim 17 wherein said machine includes a cutting tool mounted for translation in two axes and mounted for pivoting in one rotational axis, and said lateral offset is determined along one of said two translation axes.

19. A method according to claim 18 wherein said workpiece blade includes twists and is oblique to both said two translation axes, and said lateral offset is determined along one of said translation axes extending tangentially to said disk.

20. A method of machining a workpiece in a multiaxis numerically controlled machine comprising:
storing in said machine a nominal configuration of said workpiece defined by a plurality of contour points represented by coordinates of said multiple axes;
pre-machining said workpiece according to said nominal configuration;
repairing said workpiece with a repair larger than said nominal configuration;
probing said workpiece in said machine to determine a common offset of said workpiece from said nominal configuration;
shifting said workpiece by said common offset to correspond with said nominal configuration; and
machining said workpiece at said repair according to said nominal configuration while maintaining said common offset.

21. A method according to claim 20 further comprising:
fixturing said workpiece in said machine for rotation about a rotational axis; and
probing said workpiece at a plurality of points spaced radially apart from said rotational axis.

22. A method according to claim 21 wherein said workpiece includes opposite sides including said probe points, and is probed on both sides thereof for separately determining a tilt offset from said nominal configuration corresponding with said rotational axis, and a lateral offset from said nominal configuration corresponding with a linear axis normal to a radial axis from said rotational axis.

* * * * *